UNITED STATES PATENT OFFICE.

GEORGES MEUNIER, OF RAAB, AUSTRIA-HUNGARY, ASSIGNOR TO AUGUST LEDERER AND EMIL LEDERER, BOTH OF VIENNA, AUSTRIA-HUNGARY.

METHOD OF TREATING DISTILLERY-WASH.

1,107,175.  Specification of Letters Patent. Patented Aug. 11, 1914.

No Drawing.   Application filed May 17, 1911.   Serial No. 627,850.

*To all whom it may concern:*

Be it known that I, GEORGES MEUNIER, a citizen of the French Republic, residing at Raab, in Austria-Hungary, have invented certain new and useful Improvements in Methods of Treating Distillery-Wash, of which the following is a specification.

The present specification has for its object an improved method of extracting glycerin from distillery wash. According to this method, the distillery wash, which may be of any strength, is mixed with a special absorbent resulting from the carbonization by acids, either wholly or partially, of lignocellulose according to known methods, and by way of example, it may be mentioned that three parts by weight of beet-root molasses wash at 40° Bé. can be absorbed by one part by weight of the absorbent.

The carbonization of the ligno-cellulose constituting the absorbent may be effected either by means of free acids alone or, preferably, by means of compounds which tend to form such acid. For instance, in order to obtain a partly carbonized ligno-cellulose freed from incrusting substances, 100 parts of saw-dust with about 40 parts of a dilute solution, which contains about 1.2 parts of table salt and 1 part of sulfuric acid at 66° Bé., can be intimately mixed in a wooden drum, and the saw-dust, which has been saturated with this solution, is then dried at a temperature not exceeding 90° to 100° C., whereby, under the action of the hydrochloric acid formed by the salt and sulfuric acid, a partial carbonization of the ligno-cellulose, as well as the conversion of the incrusting substances accompanying the same into volatile organic acids, take place. Besides a certain quantity of finely powdered material, there is obtained a mass of larger particles consisting of partially carbonized cellulose which acts as an absorbent suitable for the distillery wash to be treated. The absorbent contains a small quantity, (3 to 3.5%), of sodium sulfate, produced by the reaction of the sulfuric acid and the salt, which acts as a drier for the wash after its absorption.

If the object is to produce a wholly carbonized cellulose freed from incrusting substances, it is advisable to treat the product obtained in the above described manner, (*i. e.*, the partially carbonized cellulose), with a mixture of salt and sulfuric acid, in which instance the proportions of the two ingredients are such as to enable them to bring about the complete carbonization of the cellulose. For example, 100 parts of partially carbonized cellulose, are intimately mixed with about 40 to 45 parts of a solution which contains about 4 to 4.2 parts of sulfuric acid at 66° Bé. and about 4.7 to 5 parts of table salt. The uniformly saturated mass is then dried at from 100° to 150° C. The coarser particles obtained, (besides a certain quantity of pulverulent carbon to be converted into briquets), consist of wholly carbonized cellulose and contain from 10% to 12% of sodium sulfate, and they can be employed without further treatment as an absorbent for the distillers' wash containing glycerin. Whether it is preferable to mix with the wash partially or wholly carbonized cellulose, or a mixture of both, depends upon the nature of the wash to be treated, and can be easily ascertained by preliminary trials with small quantities. For molasses wash, for instance, a mixture of the two absorbents above mentioned, in equal parts, has proved most advantageous.

The mixture of the absorbent wash is dried as completely as possible, and in this form it is subjected to extraction.

The improved method is carried out substantially as follows: The mass to be extracted is first washed, (for instance, in a centrifugal turbine), with pure benzene, or with a mixture of one part alcohol and two parts benzene, which serves to eliminate the greasy and resinous matters, most of the water remaining being carried away. Experience has shown that during this preliminary washing there is no carrying away of glycerin, but only of the water and of the solutions of grease, resins, coloring matter and acetic or other acids, the benzene flowing off colorless and limpid at the completion of the washing operation. The glycerin is then dissolved, the washing being either methodical or not, although methodical washing is more advantageous. The temperature of the solvent is preferably about 20 to 25° C. At this temperature, in the case of molasses wash, the extraction is rapid and the product purer than at a higher temperature, a lower temperature of the solvent conducing to a slower and less advantageous dissolution. The mixture of alcohol, benzene and glycerin resulting from the extraction so conducted is filtered, if necessary. Once or twice its volume of pure benzene is then added, the addition of this excess of benzene being made, preferably, while the mixture is being vigorously cooled, this excess of benzene having the effect of precipitating the glycerin contained in said mixture.

The precipitated glycerin is collected by decanting, and in order to render it purer, it may be treated in the same manner as the initial wash, or it may be distilled in a vacuum, according to known processes. The matter which remains as residue after action of the solvent and absorbent is washed off by means of a saline solution, and the solvent is drawn off by the said saline solution. In distilling this mixture, the solvent is collected on the one hand, and on the other hand a liquid which will serve as a washing liquid during a succeeding operation. A quantity of fresh saline solution should always be added to compensate for that which remains in the washed mass.

The mass obtained as residue after the washing with the saline solution consists of the wash freed from glycerin and of the absorbent. This mass is susceptible of varied uses; for instance, it may be washed, the absorbent then recovered, and the washing liquid utilized for irrigation of land. It may also be burned under generators, the residue remaining in the form of pearl-ash. Finally, cyanogen combinations may be drawn off by known processes.

It follows that the above method is applicable to the extraction of glycerin from distillery washes themselves as well as to the extraction of glycerin more or less pure from raw glycerins.

I claim:—

The herein described method of extracting glycerin from distilled washes in a cold state which consists in mixing with the wash an absorbent composed of acid-carbonized ligno-cellulose; drying the mixture; washing the said mixture with a mixture of alcohol and benzene, to extract the glycerin in a cold state, and precipitating the glycerin in a cold state.

In testimony whereof I have hereunto set my hand in presence of two subscribing witnesses.

GEORGES MEUNIER.

Witnesses:
 JOSEF RUBURECHT,
 AUGUST FUGGER.